Patented Apr. 12, 1927.

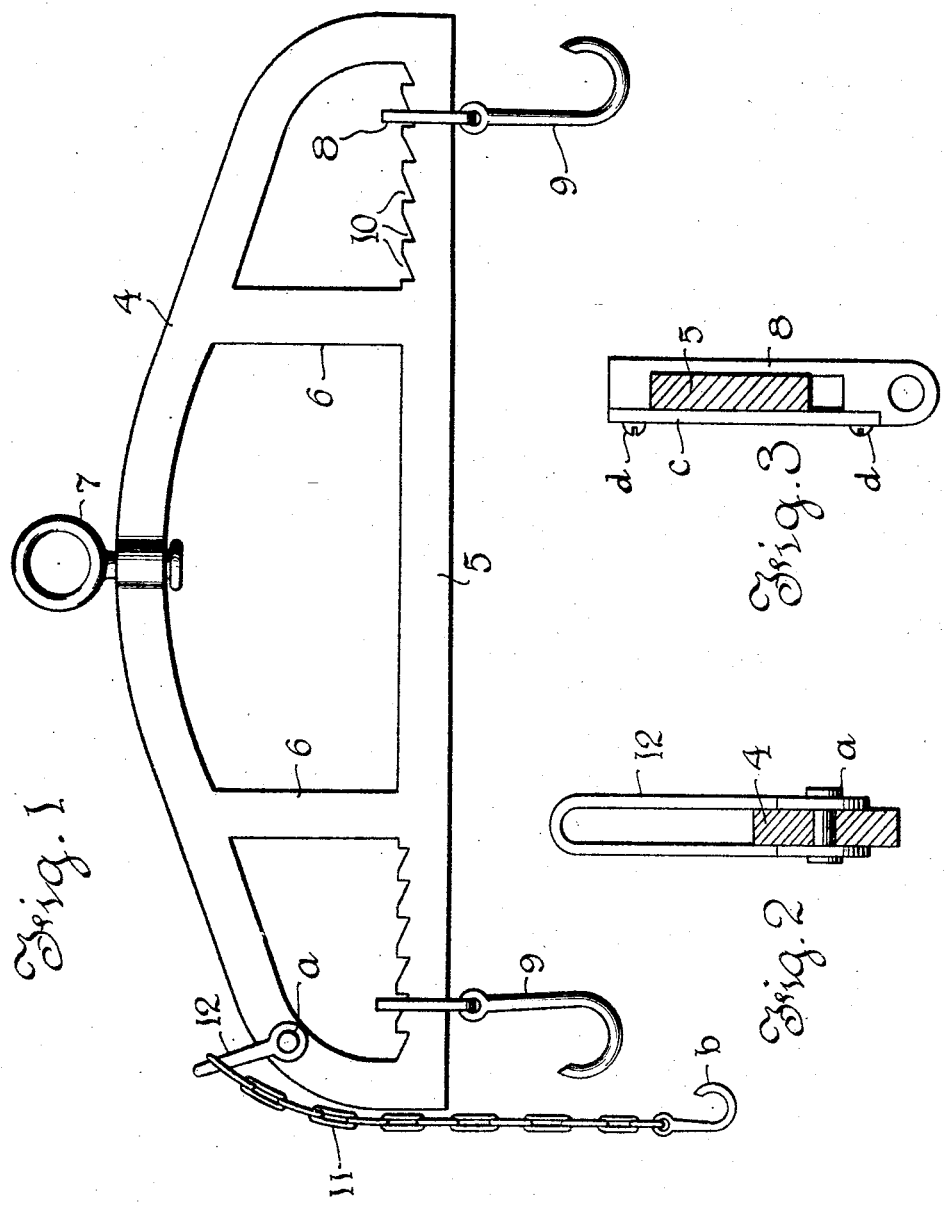

1,624,320

UNITED STATES PATENT OFFICE.

GEORGE DEMMER, OF HERNDON, KANSAS.

BUTCHER'S GAMBREL.

Application filed April 19, 1926. Serial No. 103,165.

This invention relates to a butcher's gambrel, and has for its objects to provide such a construction for a gambrel that it will adequately sustain stresses directed thereto, will have such an arrangement of parts that it will be convenient in use, and may be manufactured practically and at a limited expense, and will include adjustable features for supporting small or large carcasses of slaughtered animals.

With the foregoing objects in view and others to be mentioned hereinafter the invention presents a novel and useful construction, combination and arrangement of parts, as described herein and claimed, and as illustrated in the accompanying drawing, wherein—

Fig. 1 is a side view of a gambrel embodying my invention. Fig. 2 is a transverse section through the arcuate part of the frame, showing a link or bracket for supporting a flexible holder, attachment or chain. Fig. 3 is a transverse section through the supporting-plate of the frame, showing a slidable loop for a mounting of a hook.

Referring now to the drawing for a more particular description it should first be stated that the gambrel consists, in part, of a frame which may be constructed of any suitable material. However I prefer a comparatively thin, metallic construction.

While I have shown an integral construction for the frame, it may of course be constructed of strips connected by rivets, or bolts or otherwise, or by welding, and I do not wish to be understood as limiting myself to any kinds of material.

The frame includes an arcuate plate 4 provided with a rectilinear supporting-plate 5 which connects the opposed ends of the plate 4, braces 6 preferably being employed which connect said plates inwardly of the ends thereof, said plate 4 operating as a truss. Numeral 7 indicates a swivel which is mounted on the truss or plate 4, midway between the ends thereof.

I provide a pair of loops 8 each being slidingly mounted upon the supporting-plate 5 between an end of the frame and a brace 6, and at 9 are indicated a pair of hooks, each being carried by a loop 8.

It is well known that a gambrel is used for supporting the carcass of a slaughtered animal with its head disposed downward, the gambrel generally consisting of a bar having tapered ends adapted to traverse the rear legs, and being mounted on a support for maintaining the carcass above the ground. Also it is well known that after the entrails have been removed and other work has been completed relating thereto, and while still supported by the gambrel the carcass is usually divided, each half being supported upon an end of the gambrel. On account of the construction now presented it will be seen that the parts operate to great advantage for these purposes.

The upper edge of the plate 5, intermediate its ends and a brace 6, is provided with notches 10, these being disposed at intervals for receiving the upper parts of loops 8, and therefore said loops may be adjusted longitudinally of said plate, the hooks 9 which engage the rear legs of the carcass, being disposed nearer together or further from each other, as may be required, and depending upon the proportions of the animal, whether large or small.

On account of the construction as described, the frame may be of attenuated form, but will resist stresses to advantage, the truss 5 and braces 6 being important features. It will be noted that the frame may be swung conveniently on account of its support upon the swivel.

When removing the half-portions of a carcass from a gambrel, means should be provided for maintaining it in a horizontal position, and for this purpose I provide a flexible member or chain 11 which is secured to a link or bracket 12, said bracket being preferably of inverted U-shape and having a pivotal mounting, as indicated at $a$ upon an end of the frame, and in operation, member 11 by use of its hook $b$ may be secured to any suitable support (not shown) for maintaining the frame in, approximately, a horizontal position. If the frame is of metallic construction, to permit the loops to be mounted on the supporting-plate, said loops may be constructed as shown in Fig. 3 of the drawing, a strip $c$ being employed for a side of the loop and secured by keepers $d$. However, the loops may have any suitable construction.

In the use of the herein described gambrel, before removing either of the half-portions of a divided carcass, the holder or chain 11 should be secured to a support located above or adjacent thereto, and thereafter, that portion of the carcass at the end of the gambrel opposite to this additional holder may be removed. The use of this additional support proves to be of great advantage in maintaining the gambrel in a horizontal position and preventing a downward swinging movement of a half-portion to the ground, in the operation of unloading the gambrel.

While I have shown a chain 11 connected with the link or bracket 12, I may use a different fastening element, if desired, for stabilizing the gambrel and preventing the swinging movement mentioned. And while I have shown and described details, I do not wish to limit myself in this respect, and changes in form, size, proportion as well as minor details may be made within the scope of the invention as claimed.

I claim as my invention,—

1. In a gambrel, a frame including a supporting-plate and a truss, a pair of loops mounted on the supporting-plate, a pair of hooks each mounted on a loop, a bracket pivoted to an end of the truss, a flexible member provided with a hook and connected with the bracket, and a swivel mounted on the truss midway between the ends thereof.

2. In a gambrel, a frame consisting of a rectilinear supporting-plate provided with notches adjacent to its ends, a truss-plate connected at its ends with the terminals of the supporting-plate and braces between said plates, loops on the supporting-plate arranged to engage in said notches, a swivel mounted on the truss-plate midway between the ends thereof, hooks carried by said loops, and a flexible holder element secured to the frame near the junction of one of the ends of the truss-plate and supporting-plate.

3. In a gambrel, a frame including a rectilinear supporting-plate provided in its upper edge with notches, a truss-plate connected at its ends with the supporting-plate, a pair of loops slidingly mounted on the supporting-plate for engaging in said notches, hooks carried by the loops, a bracket mounted on the frame near one of the ends thereof, a swivel midway between the ends and mounted on the truss-plate, and a flexible holder connected with said bracket.

4. In a gambrel, a frame consisting of a supporting-plate, a truss-plate rigidly secured to the ends of the supporting-plate, braces connecting said plates inwardly of the ends of said plates, a swivel midway between the ends and mounted on the truss-plate, a fastening element connected with the truss-plate outwardly from the swivel, the parts of the supporting-plate between its ends and the braces being provided with notches at longitudinal intervals thereof, loops adapted to engage in said notches, and hooks carried by said loops.

In testimony whereof, I have affixed my signature.

GEORGE DEMMER.